H. B. KIPPER.
PROCESS OF PRODUCING FUSED FERRIC SULFATE AND SODIUM SULFATE.
APPLICATION FILED OCT. 26, 1916.
1,250,471.
Patented Dec. 18, 1917.
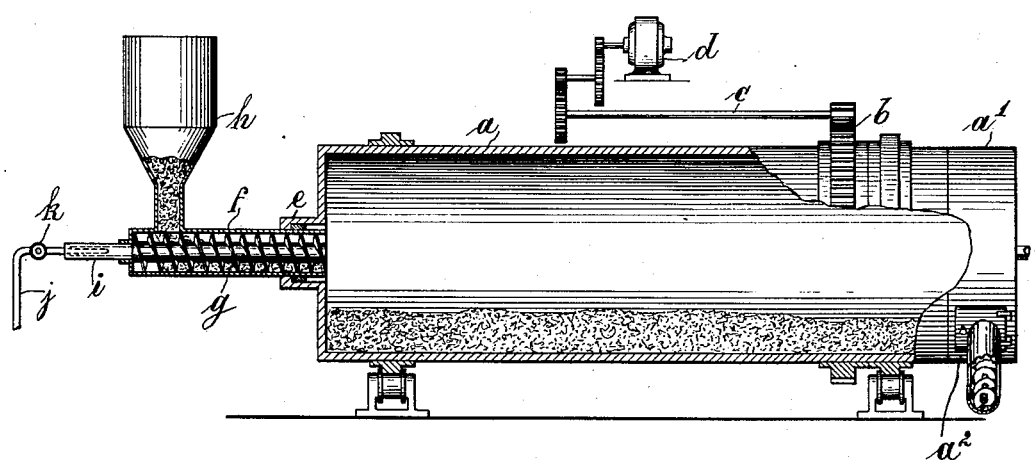
Inventor
Herman B. Kipper
By his Attorney
L. K. Bohn.

UNITED STATES PATENT OFFICE.

HERMAN B. KIPPER, OF MUSKEGON, MICHIGAN.

PROCESS OF PRODUCING FUSED FERRIC SULFATE AND SODIUM SULFATE.

1,250,471.  Specification of Letters Patent.  Patented Dec. 18, 1917.

Application filed October 26, 1916. Serial No. 127,786.

*To all whom it may concern:*

Be it known that I, HERMAN B. KIPPER, a citizen of the United States of America, and a resident of Muskegon, county of Muskegon, State of Michigan, have invented certain new and useful Improvements in Processes of Producing Fused Ferric Sulfate and Sodium Sulfate, of which the following is a specification.

This invention has reference to a novel process of producing fused ferric sulfate from relatively inexpensive materials by means of a very simple process. As a by-product sodium sulfate is obtained. The ferric sulfate may be mixed with sodium chlorid for the purpose of producing ferric chlorid and sulfate of sodium. The ferric chlorid may be decomposed with the liberation of chlorin gas. Both the sulfate of sodium and chlorin gas are used in large quantities in the chemical industries and only recently chlorin gas has been used in warfare.

It is the special object of the present invention to provide a simple and economic process for the production of the ferric sulfate and the final products, the sulfate of sodium and chlorin gas. Further it has been sought to reduce the cost of production by initiating and propagating the fusion of the materials by heat produced within the reaction vessel.

The raw materials employed in the novel process are sesqui oxid of iron and niter-cake. The sesqui oxid of iron preferably is employed in the form of the well known iron ore found in nature in rather pure quality. The niter-cake used is a by-product from the manufacture of nitric acid from sodium nitrate and represents crude sodium acid sulfate. Both substances are preferably mixed in substantially the proportions required according to the reaction as expressed in chemical equation and may be simply fused together in any suitable apparatus. I however prefer to use a rotating drum or cylinder. The temperature required to effect a complete fusion and combination of the iron ore and the niter-cake is between 300° and 400° C. If the process is carried out in the rotating drum or cylinder producer gas is introduced and burned therein to produce the temperature required for the combination and fusion of the two components of the reaction mass.

The reaction taking place between the two components finds expression in the following formula:

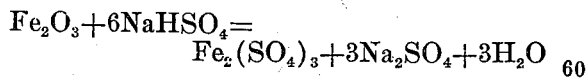

The sulfate of sodium may be purified and sold as such or it may be transformed into acid sulfate, dried and re-used in the fusion process.

The process may be carried out in any suitable apparatus. In the accompanying drawing an apparatus is diagrammatically illustrated in which the process may be carried out in an effective and economic manner.

Referring now to the drawing $a$ represents a rotatable drum or cylinder which is rotated by means of a gear $b$ and a countershaft $c$. A motor $d$ drives the countershaft and gear so that the drum may be rotated. At the end of the drum or cylinder, shown to the left on the drawing there is a central short tube $e$ into which reaches a somewhat narrower tube $f$, so arranged that the tube $f$ does not rotate with the cylinder and remains stationary all the time. A spiral feed $g$ is mounted within the tube $f$ and a hopper $h$ is provided above the same and in communication therewith to supply the mixture of sesqui oxid of iron and niter-cake. A narrow tube $i$ passes through the spiral feed and communicates with the interior of the rotatable drum. This tube connects with a tube $j$ for supplying producer gas to the drum or cylinder. A regulating valve $k$ is provided in the tube $j$. At the opposite end of the drum or cylinder, shown to the right in the drawing there is a tube portion $a^1$ which is provided with a door $a^2$ for the purpose of removing the fused mass.

The mixture of ferric oxid and niter-cake comminuted and well commingled is introduced into the drum or cylinder and the drum rotated. Producer gas is fed into the cylinder and burned therein to produce the heat required for the formation and fusion of the ferric sulfate which is raised to about 400° C. When sufficient product has been formed the motor is stopped, the supply of producer gas turned off and the product removed.

The resulting ferric sulfate may be used in various branches of chemistry but preferably is then further worked up by mixing it with sodium chlorid whereby ferric chlorid and sulfate of sodium results. The chlorid of iron may then be transformed into iron oxid and chlorin gas by combining oxygen with the iron and liberating the chlorin gas.

I claim as my invention.

1. The process of producing fused ferric sulfate and sodium sulfate consisting in mixing ferric oxid and niter-cake, and applying heat until the reaction is completed and the ferric sulfate fused.

2. The process of producing fused ferric sulfate and sodium sulfate consisting in mixing ferric oxid and niter-cake, and applying heat while agitating the mixture until the reaction is completed and the ferric sulfate fused.

3. The process of producing fused ferric sulfate and sodium sulfate consisting in mixing sesqui oxid of iron and niter-cake, and heating the mixture up to about 400° C., while agitating it by burning producer gas.

Signed at Muskegon, Michigan, this 13th day of October 1916.

HERMAN B. KIPPER

Witnesses:
E. J. GEDDES,
A. R. TROCTSCHER.